(12) United States Patent
Furukawa et al.

(10) Patent No.: US 8,032,954 B2
(45) Date of Patent: Oct. 11, 2011

(54) COUPLING MEMBER FOR TOILET SEAT DEVICE WITH WARM-WATER SPRAYS

(75) Inventors: Hideki Furukawa, Anjo (JP); Tadashi Tomita, Hekinan (JP); Hideki Kawai, Nagoya (JP); Toshiaki Takaba, Tokoname (JP); Masato Takeda, Tokoname (JP)

(73) Assignees: Aisin Seiki Kabushiki Kaisha, Aichi-ken (JP); LIXIL Corporation, Tokyo (JP)

( * ) Notice: Subject to any disclaimer, the term of this patent is extended or adjusted under 35 U.S.C. 154(b) by 1069 days.

(21) Appl. No.: 11/885,764

(22) PCT Filed: Jan. 26, 2006

(86) PCT No.: PCT/JP2006/301244
§ 371 (c)(1),
(2), (4) Date: Sep. 6, 2007

(87) PCT Pub. No.: WO2006/095504
PCT Pub. Date: Sep. 14, 2006

(65) Prior Publication Data
US 2008/0163412 A1 Jul. 10, 2008

(30) Foreign Application Priority Data
Mar. 7, 2005 (JP) .................................. 2005-062924

(51) Int. Cl.
*A47K 13/00* (2006.01)
(52) U.S. Cl. ........................................... 4/234; 4/246.1
(58) Field of Classification Search .............. 4/234, 241, 4/246.1, 246.2; 285/22, 111
See application file for complete search history.

(56) References Cited

U.S. PATENT DOCUMENTS
2,359,942 A * 10/1944 Rosenzweig .............. 267/140.5
(Continued)

FOREIGN PATENT DOCUMENTS
JP 62-72372 10/1985
(Continued)

OTHER PUBLICATIONS
International Search Report for PCT/JP2006/301244, mailed Feb. 21, 2006, in Japanese.
(Continued)

*Primary Examiner* — Davis Hwu
(74) *Attorney, Agent, or Firm* — Stites & Harbison PLLC; Juan Carlos A. Marquez, Esq.

(57) ABSTRACT

To provide a coupling member for fixing a toilet seat device with warm-water sprays on a toilet bowl that is able to prevent a bolt from being screwed too tightly. A coupling member for fixing a toilet seat device with warm-water sprays on a toilet bowl is constituted and characterized by comprising a circular cylindrically-shaped elastic deforming portion 70 that is inserted into a mounting hole 14 formed at a rear portion of a toilet bowl 10, a bolt 60 that is inserted into the aforementioned circular cylindrically-shaped elastic deforming portion 70 and that has a threaded portion 62 and a stopper portion 64 formed respectively on a lower side and an upper side, and a nut 80 that is provided on the aforementioned circular cylindrically-shaped elastic deforming portion 70 and screwed on the aforementioned threaded portion 62 and that moves upward by a rotational operation in one direction from an upper side of the aforementioned bolt 60 so as to enlarge the aforementioned circular cylindrically-shaped elastic deforming portion 70 in a circumferential direction.

6 Claims, 2 Drawing Sheets

U.S. PATENT DOCUMENTS 2,783,810 A * 3/1957 Wrigley ..................... 411/136
5,918,322 A * 7/1999 Yamamoto et al. ............ 4/248

FOREIGN PATENT DOCUMENTS

| JP | HEI4-101005 | 2/1991 |
|----|-------------|--------|
| JP | HEI5-52323 | 12/1991 |

OTHER PUBLICATIONS

International Search Report for PCT/JP2006/301244, in Japanese, Section C in English.

* cited by examiner

COUPLING MEMBER FOR TOILET SEAT DEVICE WITH WARM-WATER SPRAYS

TECHNICAL FIELD

This invention relates to a coupling member for a toilet seat device with warm-water sprays, more particularly to a coupling member that detachably couples a toilet bowl with a toilet seat device with warm-water sprays.

BACKGROUND ART

As is known in the art, a coupling member is used to install a toilet seat device with warm-water sprays at a rear portion of a toilet bowl. The coupling member is inserted in a mounting hole formed at the rear portion of the toilet bowl. A wide variety of coupling members are provided as the coupling member. A coupling member for a toilet seat device with warm-water sprays is disclosed in a Patent document No. 1, for example, in which it has a good workability since it is operated only from an upper side of the toilet bowl.

That is, the coupling member for the toilet seat device with warm-water sprays disclosed in the Patent document No. 1 has a circular cylindrically-shaped elastic deforming portion that is inserted into a mounting hole formed at a rear portion of a toilet bowl, a bolt that is inserted into the circular cylindrically-shaped elastic deforming portion and that has a threaded portion along an entire length thereof except a head portion, and a nut that is provided on the circular cylindrically-shaped elastic deforming portion, screwed on the threaded portion, and moved upward by rotational operation in one direction from an upper side of the bolt so as to enlarge the circular cylindrically-shaped elastic deforming portion in a circumferential direction. In such coupling member for the toilet seat device with warm-water sprays, if the nut is moved upward by the rotational operation in one direction from the upper side of the bolt, the circular cylindrically-shaped elastic deforming portion is enlarged in the circumferential direction. Then, when the circular cylindrically-shaped elastic deforming portion enlarged in the circumferential direction is strongly and firmly held between the nut and an inner wall of the mounting hole of the toilet bowl, the toilet seat device with warm-water sprays located at the side of the coupling member is indirectly and detachably fixed on the toilet bowl.

PATENT DOCUMENT No. 1: Japanese Laid Open Utility Model Publication No. Shou-62-72372

DISCLOSURE OF THE INVENTION

Problems that the Invention is to Solve

In the coupling member for the toilet seat device with warm-water sprays disclosed in the aforementioned Patent document No. 1, the circular cylindrically-shaped elastic deforming portion is enlarged in the circumferential direction by the nut that is moved upward by the rotational operation in one direction from the upper side of the bolt. Then, when the circular cylindrically-shaped elastic deforming portion enlarged in the circumferential direction is strongly and firmly held between the nut and the inner wall of the mounting hole of the toilet bowl, the toilet seat device with warm-water sprays located at the side of the coupling member is indirectly and detachably fixed on the toilet bowl. However, in case a number of rotation of the bolt is overmuch, that is, if the bolt is too tightly screwed, there is a possibility that the circular cylindrically-shaped elastic deforming portion is overly compressed and impairs its restorability. In such case, when the toilet seat device with warm-water sprays is installed on the toilet bowl once again after being taken out for cleaning up an entire upper surface of the toilet bowl, there is a possibility that the circular cylindrically-shaped elastic deforming portion is not properly enlarged in the circumferential direction, thereby making it uncertain to fix the toilet seat device with warm-water sprays located at the coupling member side on the toilet bowl.

Therefore, an object of the present invention is to provide a coupling member for a toilet seat device with warm-water sprays that does not have such a problem.

Means for Solving the Problem

As described in claim 1, a technical measure for solving the aforementioned problem is to constituted "a coupling member comprising a circular cylindrically-shaped elastic deforming portion that, when it is extendedly located at an inside of a mounting hole formed on an installation portion at a rear portion of a toilet bowl via a predetermined member at a side of a toilet seat device with warm-water sprays, is used for coupling it to the aforementioned toilet bowl so as to be positioned inside the aforementioned mounting hole, a resin-made washer that is located on the aforementioned predetermined member and on which an upper end portion of the aforementioned circular cylindrically-shaped elastic deforming portion is secured via a hole formed on the predetermined member, a bolt that is rotatably inserted into the aforementioned resin-made washer and the aforementioned circular cylindrically-shaped elastic deforming portion and inserted into the aforementioned circular cylindrically-shaped elastic deforming portion and that has a threaded portion formed on a lower side thereof and a stopper portion formed on an upper side of the aforementioned threaded portion adjacent thereto in addition, and a nut that is provided on a lower side of the aforementioned circular cylindrically-shaped elastic deforming portion and screwed on the aforementioned threaded portion and that moves in an upward direction by a rotational operation in one direction from an upper side of the bolt so as to enlarge the aforementioned circular cylindrically-shaped elastic deforming portion in a radial direction, wherein the aforementioned circular cylindrically-shaped elastic deforming portion enlarged in the aforementioned radial direction is elastically engaged with an inner peripheral surface of the aforementioned mounting hole."

Effects of the Invention

According to the coupling member for the toilet seat device with warm-water sprays defined in claim 1, the circular cylindrically-shaped elastic deforming portion is enlarged in the radial direction by the nut that is moved upward by the rotational operation in one direction from the upper side of the bolt. When the circular cylindrically-shaped elastic deforming portion enlarged in the radial direction is strongly and firmly held between the nut and the inner wall of the mounting hole of the toilet bowl, the toilet seat device with warm-water sprays located at the coupling member side is indirectly and detachably fixed on the toilet bowl. However, since an ascending amount of the nut is regulated by the stopper portion, there is caused no problem that the bolt is excessively rotated or the bolt is too tightly screwed. Therefore, there is no problem that the circular cylindrically-shaped elastic deforming portion is overly compressed to have its restorability impaired.

EXPLANATION OF CODES

Figure 1:
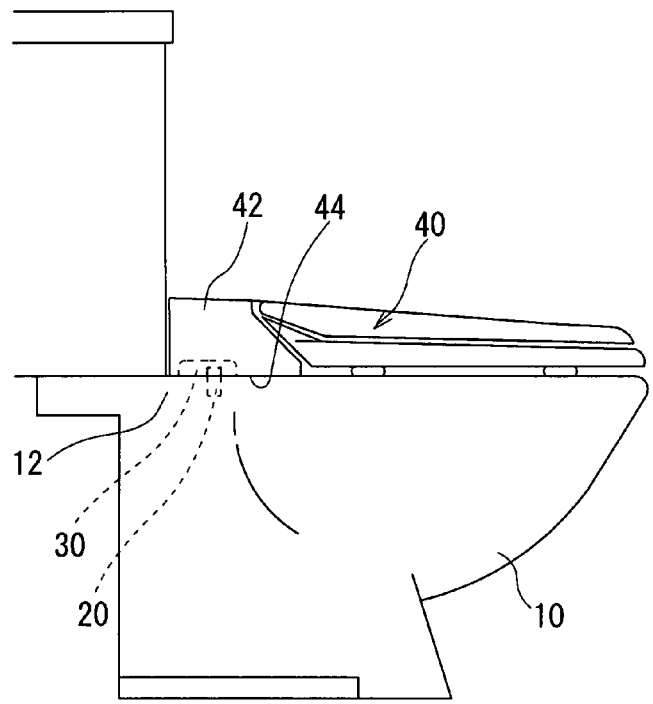
FIG. 1 is a side elevation view of a toilet adopting a coupling member for a toilet seat device with warm-water sprays according to one example of an embodiment of the invention.

10: toilet bowl
12: installation portion
14: mounting hole
20: coupling member
50: resin-made washer
60: nut
62: threaded portion
64: stopper portion
70: circular cylindrically-shaped elastic deforming portion
80: nut

BEST MODE FOR PRACTISING THE INVENTION

An example of an embodiment of the invention is described hereunder referring to the drawings.

As shown in FIG. 1, a plate 30 is fixed on an installation portion 12 at a rear portion of a toilet bowl 10 by a coupling member 20. A bottom portion 44 of a case 40 of a toilet seat device with warm-water sprays 40 is detachably and slidably joined to the plate 30. That is, the bottom portion 44 of the case 42 and the plate 30 are fitted and connected with each other in a concavo-convex manner by a mechanism not shown in the figure. The bottom portion 44 of the case 42 and the plate 30 are normally locked on each other so as to be inseparable and integral with each other. However, in case the lock is released, the bottom portion 44 of the case 42 and the plate 30 are made into a relatively movable state. Then, if the toilet seat device with warm-water sprays 40 is pulled out as a whole to a front side of the toilet bowl 10 (rightward direction in FIG. 1), the toilet seat device with warm-water sprays 40 is detached from the toilet bowl 10. As a result, a surface of the toilet bowl 10 can be cleaned up.

Figure 2:
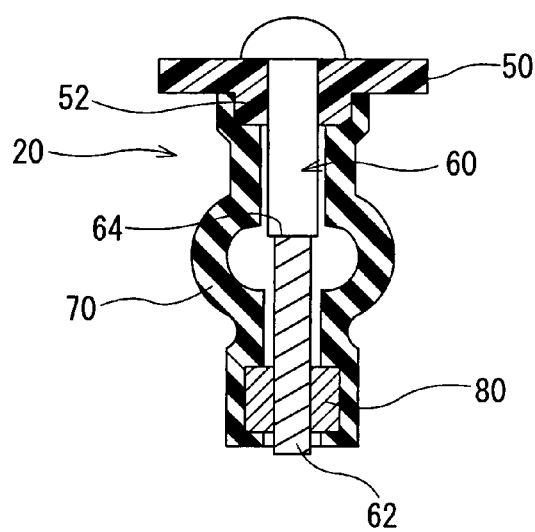
FIG. 2 is a cross-sectional view of the coupling member for the toilet seat device with warm-water sprays according to the one example of the embodiment of the invention.

As shown in FIG. 2, the coupling member 20 has a bolt 60 that rotatably goes through a resin-made washer 50. A threaded portion 62 and a stopper portion 64 are formed on each of a lower side and an upper side of the bolt 60, respectively. A tube portion 52 is integrally formed on the lower side of the resin-made washer 50. An upper end of a circular cylindrically-shaped elastic deforming portion 70, which accommodates the bolt 60 in a loose manner therein, is fitted on an outside of the tube portion 52. A nut 80 that is screwed and moved on the threaded portion 62 of the bolt 60 is fixed at an inside of a lower end portion of the circular cylindrically-shaped elastic deforming portion 70. Thus, the coupling member 20 constitutes an assembled body (assembly) that includes the circular cylindrically-shaped elastic deforming portion 70, the resin-made washer 50 on which the upper end portion of the circular cylindrically-shaped elastic deforming portion 70 is secured, the bolt 60 that is rotatably inserted into the resin-made washer 50 and the circular cylindrically-shaped elastic deforming portion 70 and that has the threaded portion 62 and the stopper portion 64 at the lower side and the upper side, respectively, and the nut 80 that is provided at the lower side of the circular cylindrically-shaped elastic deforming portion 70 and screwed on the threaded portion 62 and that moves in an upward direction by an rotational operation in one direction from the upper side of the bolt 60 so as to enlarge the circular cylindrically-shaped elastic deforming portion 70 in a radial direction. A diameter of the stopper portion 64 is larger than a diameter of the threaded portion 62. A boundary between the both members has a stepped structure.

Therefore, though FIG. 2 shows a single item of the assembled body of the coupling member 20, the circular cylindrically-shaped elastic deforming portion 70 bulges out in a radially outside direction in this state, even when the nut 80 is screwed onto the lowest portion of the threaded portion 62 of the bolt 60.

Figure 3:
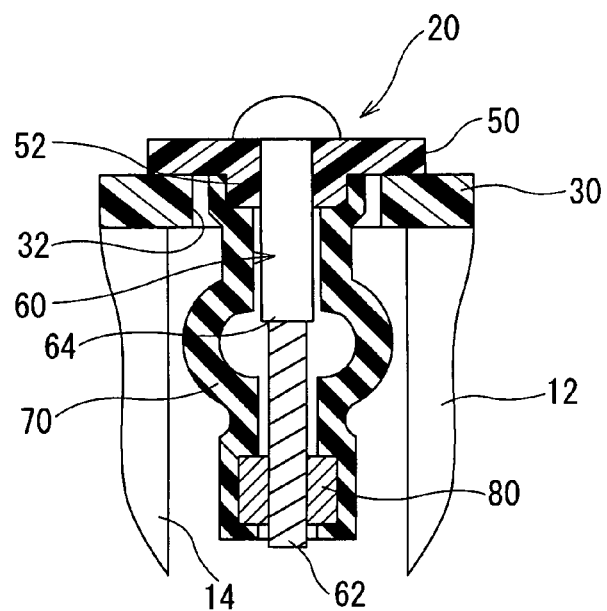
FIG. 3 is a cross-sectional view of the coupling member for the toilet seat device with warm-water sprays according to the one example of the embodiment of the invention, while showing a state when it starts a coupling function.
Figure 4:
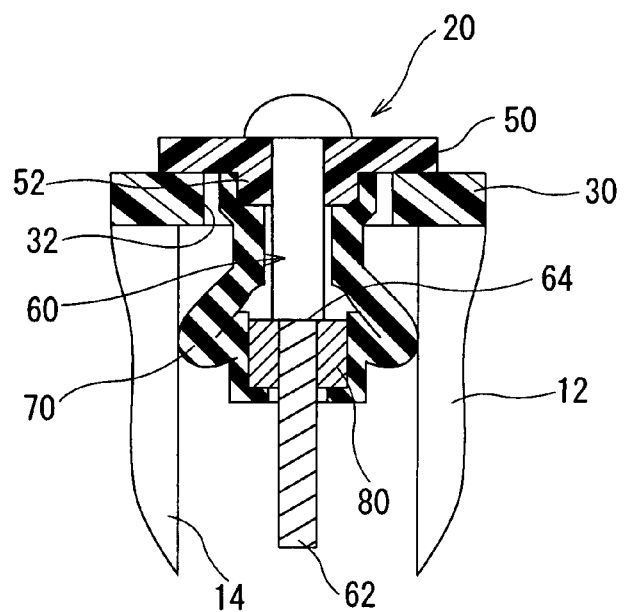
FIG. 4 is a cross-sectional view of the coupling member for the toilet seat device with warm-water sprays according to the one example of the embodiment of the invention, while showing a state when it performs the coupling function at a maximum.

The coupling member 20 constituted as such assembled body secures the plate 30 on the installation portion 12 at the rear portion of the toilet bowl 10 by the following procedure. Specifically, first, as shown in FIG. 3, the circular cylindrically-shaped elastic deforming portion 70 of the coupling member 20 as a bolt assembled body is inserted into a hole 14 of the installation portion 12 of the toilet bowl 10 via a hole 32 of the plate 30. Then, the resin-made washer 50 is engaged with the plate 30. Thus, the circular cylindrically-shaped elastic deforming portion 70 and the bolt 60 located therein become such a state as if they hang from the plate 30. In this state, the bolt 60 is rotated in one direction. Then, the nut 80 is moved upward along the threaded portion 62 until it is engaged with the stopper portion 64, since the threaded portion 62 rotating in the one direction is screwed into the nut 80 that is secured at the inside of the lower end portion as a free end side of the circular cylindrically-shaped elastic deforming portion 70 having the upper end portion in a fixed state.

Therefore, if the nut 80 fixed at the inside of the lower end portion as the free end side of the circular cylindrically-shaped elastic deforming portion 70 having the upper end portion in the fixed state moves upward, the circular cylindrically-shaped elastic deforming portion 70 is enlarged in the radial direction. Then, when the nut 80 is completely moved upward and engaged with the stopper portion 64, the circular cylindrically-shaped elastic deforming portion 70 is enlarged in the radial direction to a considerable amount, Thereby, the circular cylindrically-shaped elastic deforming portion 70 is elastically engaged with the inner wall of the hole 14 of the installation portion 12 of the toilet bowl 10 or compresses it. This elastically touched engagement or compression acts as a frictional force to block the circular cylindrically-shaped elastic deforming portion 70 from moving in a releasing direction, thereby fixing the plate 30, which is integrated into the toilet seat device with warm-water sprays 40, on the toilet bowl 10.

That is, the circular cylindrically-shaped elastic deforming portion 70 is enlarged in the radial direction by the nut 80 that moves in the upward direction by the rotational operation in one direction from the upper side of the bolt 60. Then, when the circular cylindrically-shaped elastic deforming portion 70 thus enlarged in the radial direction is strongly and firmly held between the nut 80 and the inner wall of the mounting hole 14 of the toilet bowl 10, the toilet seat device with warm-water sprays 40 located at the side of the coupling member 20 is to be indirectly and detachably fixed on the toilet bowl 10. Therefore, since an ascending amount of the nut 80 is regulated by the stopper portion 62 that is formed into the diameter larger than the threaded portion 62, there is caused no problem that the bolt 60 is excessively rotated or the bolt 60 is too tightly screwed. Therefore, there is no problem that the circular cylindrically-shaped elastic deforming portion 70 is overly compressed to have its restorability impaired. It is possible to regulate an upwardly moving amount of the nut 80 by another means. For example, though not shown in the figure, a plurality of projections or rings existing extendedly in a circumferential direction may be provided on an uppermost end portion of the threaded portion 62 so as to give them a function as a stopper. In this case, the bolt 60 will have a threaded portion at a lower side and a straight portion at an upper side, while the straight portion having the same diameter as the threaded portion. Moreover, it is possible to form a threaded portion along an entire length of the bolt 60 (except a head portion), while providing the aforementioned projections or the rings on appropriate positions.

In a state shown in FIG. 3, a diameter of the hole 32 of the plate 30 allows the coupling member 20 as a single assembly to pass through it, while allowing the coupling member 20 to freely move after the passing. That is, the coupling member 20 is loosely inserted into the hole 32 of the plate 30. This is to enable fine adjustment of a relative positional relationship between the plate 30 and the installation portion 12 of the toilet bowl 10.

The invention claimed is:

1. A coupling member comprising a circular cylindrically-shaped elastic deforming portion that, when it is extendedly located at an inside of a mounting hole formed on an installation portion at a rear portion of a toilet bowl via a predetermined member at a side of a toilet seat device with warm-water sprays, is used for coupling it to the toilet bowl so as to be positioned inside the mounting hole, a resin-made washer that is located on the predetermined member and on which an upper end portion of the circular cylindrically-shaped elastic deforming portion is secured via a hole formed on the predetermined member, a bolt that is rotatably inserted into the resin-made washer and the circular cylindrically-shaped elastic deforming portion and inserted into the circular cylindrically-shaped elastic deforming portion and that has a threaded portion formed on a lower side thereof and a stopper portion formed on an upper side of the threaded portion adjacent thereto in addition, and a nut that is provided on a lower side of the circular cylindrically-shaped elastic deforming portion and screwed on the threaded portion and that moves in an upward direction by a rotational operation in one direction from an upper side of the bolt so as to enlarge the circular cylindrically-shaped elastic deforming portion in a radial direction, wherein the circular cylindrically-shaped elastic deforming portion enlarged in the radial direction is elastically engaged with an inner peripheral surface of the mounting hole, and wherein the circular cylindrically-shaped elastic deforming portion is sealingly engaged with the inner surface of the mounting hole when the nut is screwed and moved on the threaded portion of the bolt so as to be engaged with the stopper portion.

2. A coupling member as recited in claim 1, in which the predetermined member is a plate which is fixed on the installation portion of the toilet bowl and on which the toilet seat device with warm-water sprays is detachably fitted.

3. A coupling member as recited in claim 1, in which the extended location at the inside of the hole of the predetermined member is made in a loosely fitted manner.

4. A coupling member for the toilet seat device with warm-water sprays as recited in claim 1, in which the stopper portion is constituted by making a diameter of a portion above the threaded portion of the bolt larger than the threaded portion.

5. A coupling member as recited in claim 1, in which the circular cylindrically-shaped elastic deforming portion bulges out in the radial direction even when the nut is screwed into a lowermost portion of the threaded portion of the bolt.

6. A coupling member as recited in claim 1, in which the circular cylindrically-shaped elastic deforming portion, the resin-made washer, the bolt and the nut are constituted as an assembled body.

\* \* \* \* \*